Feb. 4, 1958     J. C. HOLLIS     2,822,180
POWER OPERATED CHUCK FOR MACHINE TOOLS
Filed Aug. 2, 1955     3 Sheets-Sheet 1
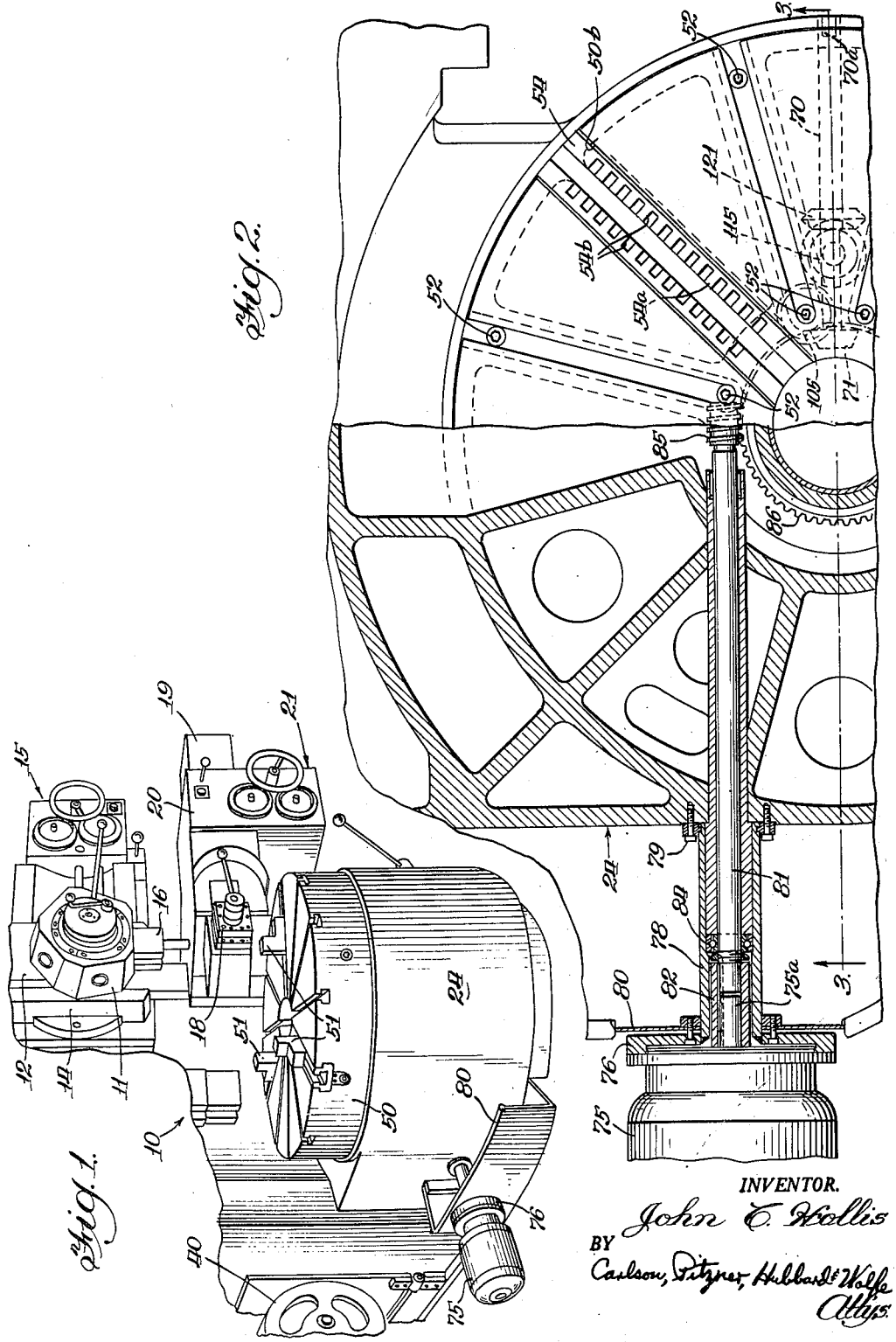
INVENTOR.
John C. Hollis
BY Carlson, Pitzner, Hubbard & Wolfe
Attys.

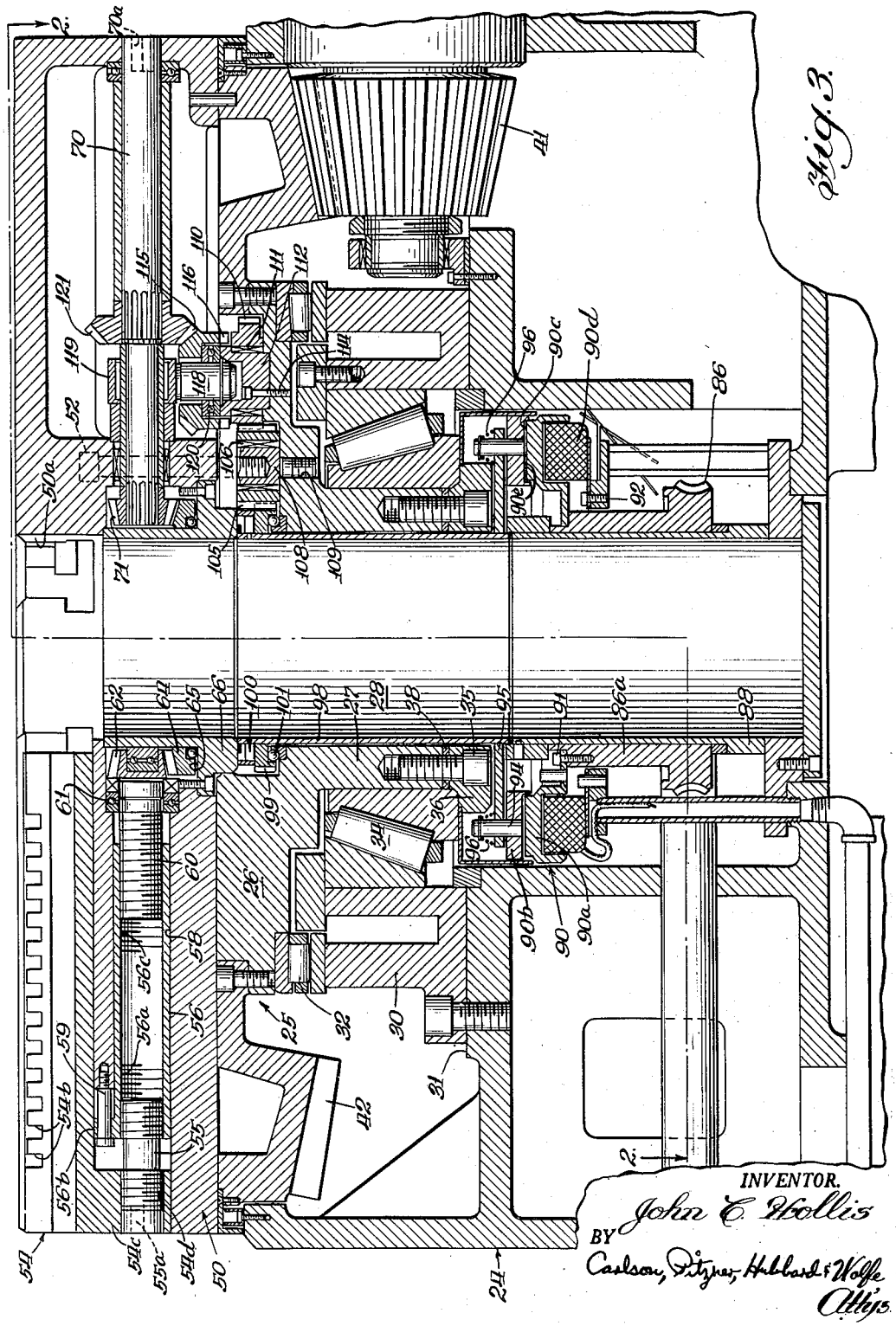

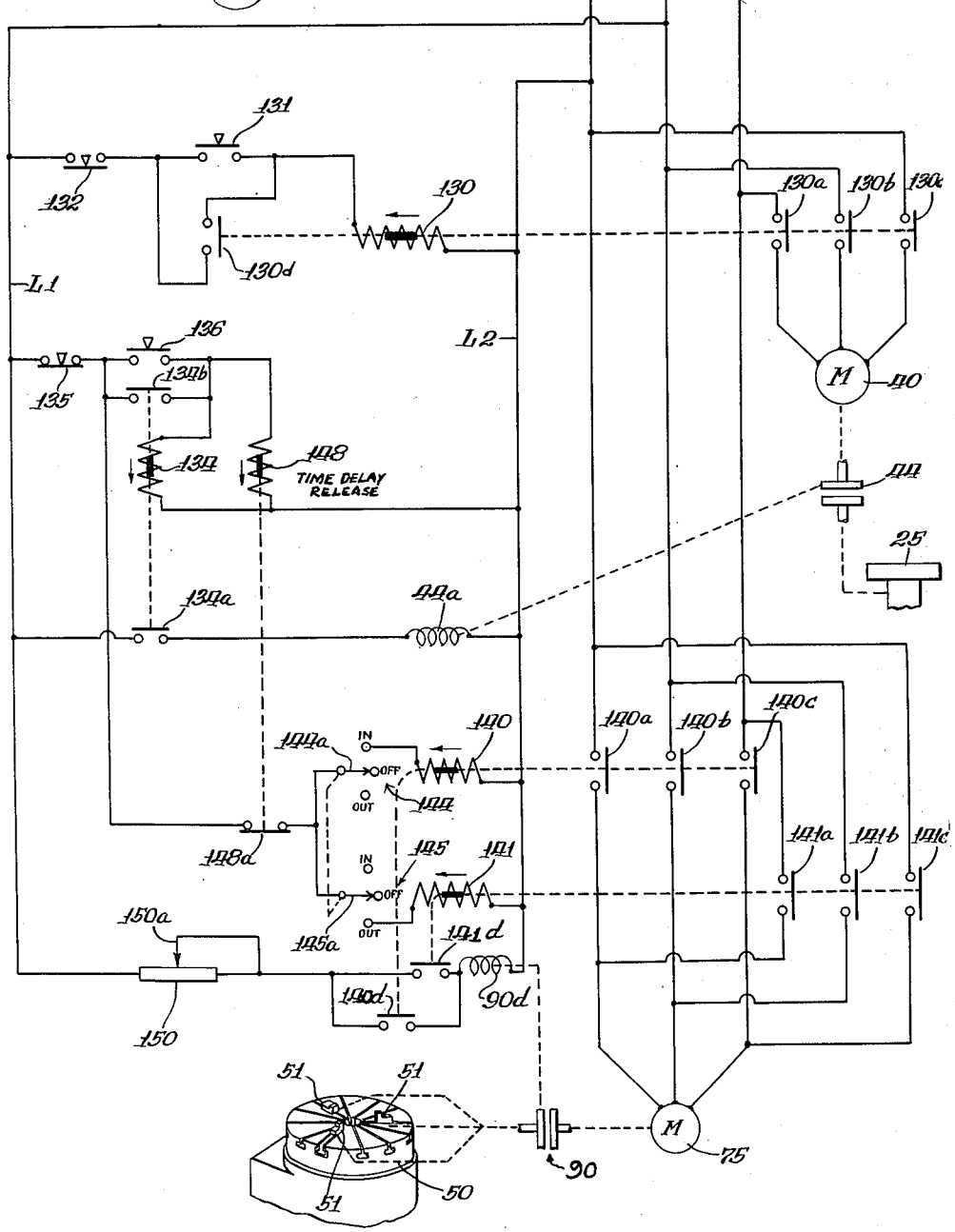

United States Patent Office 2,822,180
Patented Feb. 4, 1958

2,822,180
POWER OPERATED CHUCK FOR MACHINE TOOLS

John C. Hollis, Fond du Lac, Wis., assignor to Giddings & Lewis Machine Tool Company, Fond du Lac, Wis., a corporation of Wisconsin Application August 2, 1955, Serial No. 525,914

10 Claims. (Cl. 279—113)

This invention relates to machine tools and, more particularly, to power operated chucks for clamping and holding workpieces on rotating parts of machine tools. While not so limited in its utility, the invention finds especially advantageous application in chucks for vertical turret lathes.

The general aim of the invention is to create an improved power operated chuck which is extremely reliable and compact, which is adapted for field installation on existing machines, and yet which is easily controlled both as to the closing and opening of chuck jaws and the magnitude of clamping pressure exerted on a workpiece.

An important object of the invention is to provide such a power operated chuck which leaves unobstructed a central passage in the rotatable machine tool part so that a stem or shaft on a chucked workpiece may extend therethrough.

It is another object to provide such a power operated chuck in which the body carrying the jaws may be readily removed from and replaced on the rotatable machine tool part, a disengageable drive coupling acting also to positively unlock the jaws from a workpiece.

A further object is to provide a power operated chuck and controls therefor which prevent movement of the chuck jaws while the machine tool part is rotating, so that a workpiece cannot be inadvertently loosened and thrown from the chuck.

Additional objects reside in the provision of such a chuck which is electrically powered and controlled; which retains a chucked workpiece even if the power supply should fail; which permits both universal and individual manual adjustment of the chucked jaws if that is desired; and which may be controlled from a remote location such as a movable control pendant.

Other objects and advantages will become apparent as the following description proceeds, taken in conjunction with the accompanying drawings in which:

Figure 1 is a fragmentary perspective view of a vertical turret lathe equipped with a power operated chuck embodying the invention;

Fig. 2 is a view taken substantially along the offset line 2—2 in Fig. 3 and showing the power chuck partially in plan and partially in horizontal section;

Fig. 3 is a vertical section taken substantially along the offset line 3—3 in Fig. 2; and Fig. 4 is a schematic diagram of the electric controls for the power operated chuck.

While the invention has been shown and is described in some detail with reference to a particular embodiment thereof, there is no intention that it thus be limited to such detail. On the contrary, it is intended here to cover all modifications, alternative constructions and equivalents falling within the spirit and scope of the invention as defined by the appended claims.

A vertical turret lathe 10 has been illustrated in Fig. 1 as an exemplary machine tool with which the power chuck of the present invention finds particularly advantageous use. By way of background, the lathe 10 includes an angularly indexable turret 11 supported on a vertically translatable slide 12. The latter is, in turn, movable horizontally with a saddle 14 carried by a cross rail. The feed movements of the slide 12 and the saddle 14 are controlled from a feed gearing head 15. A plurality of tool holders may be fixed around the turret 11 and brought selectively into position for placing a tool in cutting engagement with a workpiece (not shown) supported in the chuck in a manner to be described. One such tool holder 16 is illustrated in Fig. 1.

The vertical turret lathe 10 may also include an auxiliary tool holder 18 which is carried at the inner end of a horizontally feedable slide 19 movable vertically with a saddle 20, the feed movements being effected and controlled by feed gearing in an auxiliary head 21.

For rotating a workpiece relative to the tool holders 16 and 18, the lathe has a heavy base casting 24 journaling a spindle 25 for rotation about a vertical axis. The spindle 25 includes a horizontal, annular sub-table 26 together with a depending cylindrical spindle portion 27 defining a vertical hollow passage 28.

The spindle 25 may be supported and journaled in the base 24 as described and claimed in applicant's copending U. S. application Serial No. 446,196, filed July 28, 1954. Briefly, the arrangement includes a support ring 30 bolted fast to a flat annular surface 31 on the casting 24, a vertical thrust bearing 32 being interposed between the upper surface of this ring and the underside of the sub-table 26. An anti-friction roller bearing 34 is disposed between the inner cylindrical surface of the ring 30 and the outer surface of the cylindrical spindle portion 27, this bearing being preloaded by tightening bolts 35 which draw a collar 36 axially against the inner race. A shim 38 interposed between the lower end of the spindle portion 27 and the collar 36 determines the degree of preloading afforded by tightening of the bolts 35. The bearing 34 thus maintains the sub-table 26 in axial alinement while transmitting radial and axial cutting forces on a workpiece to the machine base, and even though the parts may expand as a result of frictional heating during operation.'

Power for rotating the spindle 25 is taken from a main motor 40 (Figs. 1 and 4) and supplied through a suitable multi-speed transmission disposed in the lower portion of the vertical turret lathe to a bevel gear 41 (Fig. 3) which meshes with a large, annular ring gear 42 bolted fast to the sub-table portion 26 and extending radially to form a part thereof. While the multi-speed transmission for connecting the motor 40 to the bevel gear 41 may take a variety of forms familiar to those skilled in the art, such transmission may preferably be of the type disclosed and claimed in applicant's copending U. S. application Serial No. 525,469, filed August 1, 1955. In any event, the transmission will include a clutch shown schematically at 44 in Fig. 4 for disengaging the drive connection between the motor 40 and spindle 25.

In many instances, only a work table with T-slots cut in it fastened to the surface of the sub-table 26. This is suitable for holding a variety of workpieces by bolting them in well known fashion to the table. However, it is more convenient in the majority of operations to mount a chuck body having radially movable work-holding chuck jaws on the sub-table and to clamp and release workpieces to the chuck body simply by running those jaws inwardly or outwardly. The chuck body may also have T-slots cut therein to permit a workpiece to be fastened by bolts, if that is desired.

The exemplary power operated chuck here shown comprises a body 50 adapted to be fixed to the sub-table and carrying a plurality of angularly spaced, radially movable chuck jaws 51. In the present instance, three such jaws are spaced 120° around the axis of the chuck body (Fig. 1). With more particular reference to Fig. 3, the chuck body 50 is annular in shape and has a central vertical opening 50a which is alined with the passage 28 in the spindle portion 27 when the body is fixed to the sub-table 26 by means of a plurality of holddown bolts 52. A plurality of angularly spaced radial grooves 50b, in this instance three, are formed in the upper surface of the chuck body 50 and receive radially movable jaw slides 54. These slides shown in Figs. 2 and 3 have a central longitudinal slot 54a bordered by transverse keyways 54b adapted to receive mating keys on the jaws 51. The jaws may thus be vertically slipped into the respective slides at different radial positions. Downturned lugs 54c at the outer ends of the slides 54 (Fig. 3) have a drilled and tapped hole 54d receiving one threaded end of a short shaft 55 which is socketed as at 55a to receive a hand tool such as an Allen wrench. The innermost end of the short shaft 55 is threaded oppositely from the outermost end and received within a threaded interior portion 56a of a sleeve 56. The latter is axially movable within a radial passage 58 formed in the chuck body 50, but is restrained against rotation by a radial lug 56b apertured and axially slidable on a bolt 59 threaded into a portion of the chuck body. The opposite interior portion 56c of the sleeve 56 is also tapped to receive the threaded shank of a shaft 60 journaled by anti-friction bearings at 61 in the passage 58 and presenting a rigid or integral bevel gear 62 at its inner end. The latter gear meshes with an annular ring gear 64 rotatable on a shoulder 65c of a sleeve 66 forming part of the chuck body.

It will thus be seen that rotation of the ring gear 64 turns the threaded shaft 60 so that the sleeve 56 is moved radially inward or outward. By connection of the sleeve through the short shaft 55 to the jaw slide 54, the latter is correspondingly moved radially in the body 50. The initial position of each jaw slide 54 may be individually adjusted by turning the short shaft 55 with a hand wrench so that the slide 54 is moved radially inward or outward relative to the sleeve 56.

For rotating the ring gear 64 and thus moving the jaw slides 54 in unison, at least one and preferably three angularly spaced radial shafts 70 are suitably journaled in the chuck body as shown in Fig. 3. The outer ends of these shafts are socketed as at 70a to receive a hand tool such as an Allen wrench so that the jaws may be moved manually if that is desired. It will be observed from Fig. 3 that the inner end of each shaft 70 carries a bevel pinion 71 which is also meshed with the annular ring gear 64. Rotation of any one of the several shafts 70 thus causes radial movement of the several jaws 51 in unison.

Provision is made for power driving the jaw slides radially inward or outward when the spindle or sub-table is stationary. By simple control of the power means the jaws 51 may thus be brought into snug chucking engagement with a workpiece (not shown) resting on the upper surface of the chuck body 50. In accordance with the invention, an electric motor for powering the chuck jaws is mounted fast in the base 24, and a clutch is provided having selectively locked first and second annular clutch elements journaled on the base 24 and the spindle 25, respectively. The first clutch element has a permanent drive connection to the chuck motor, and the second clutch element has a drive connection with the jaw slides. The latter drive connection includes components on the spindle leaving its central passage 28 unobstructed and components in the body 50, the two being coupled as an incident to location of the body on the sub-table by a lost motion impact device which is not only readily uncoupled but which prevents locking of the jaws in engagement with a workpiece.

Referring now in more detail to Figs. 2 and 3, a reversible chuck motor 75 is suitably supported from the machine base 24. In this instance, the motor 75 is bolted to a flange 76 welded at the outer end of a hollow sleeve 78 which, in turn, is bolted as at 79 to the base 24. This permits the motor 75 to be spaced outwardly from a trough 80 adapted to catch tool cooling fluid spilled downwardly from the workpiece supported in the chuck. The motor shaft 75a is coupled to the outer end of an extension shaft 81 by keyed connection to a coupling sleeve 82, the latter shaft being journaled by an anti-friction bearing 84 in the sleeve 78 and extending inwardly to carry a worm gear 85. This worm gear meshes with a worm wheel 86 supported for rotation about a cylindrical member 88 extending upwardly from the lower portion of the base 24. It will be observed that the worm gear 86 has an integral, upwardly extending cylindrical portion 86a.

For transmitting power to radially adjust the jaw slides in the body 50 when the spindle 25 is stationary, while nevertheless permitting rotation of the body 50 and spindle 25 relative to the worm wheel 86 during machining operations, an electric clutch 90 is interposed between the worm wheel 86 and chuck-actuating components carried by the spindle 25. In accordance with an important feature of the invention, the electric clutch has two annular friction elements 90a, 90b which are disposed concentrically about the axis of spindle rotation and leave the central passage 28 unobstructed. In the present instance, the first clutch element 90a is formed as a shoe rigidly fixed as by bolts 91 to the upper end of the worm wheel portion 86a. This shoe has an upper friction surface 90c and is spaced only slightly above an electro-magnetic clutch-actuating coil 90d. The latter is stationarily mounted in the base 24 by suitable means such as bolts 92. The second clutch element 90b is formed as an annular ring armature disposed directly above the shoe 90a, and carried by a plurality of pins 94 axially shiftable in a flange 95. Biasing springs 96 on each of the pins 94 urge the armature 90b and its lower friction surface 90e upwardly and away from the friction surface 90c. However, upon energization of the clutch coil 90d, the armature 90b is magnetically attracted into frictional driving engagement with the shoe 90a.

The flange 95 is supported for rotation with and relative to the spindle 25 since it is welded or otherwise rigidly fixed to the lower end of a sleeve 98 concentrically and rotatably disposed within the spindle portion 27. At its upper end, the sleeve 98 carries a spur ring gear 99 locked by set screws 100 and journaled by an anti-friction bearing 101 resting on a radial shoulder in the sub-table 26. When the sub-table 26 is stationary and the motor 75 and clutch coil 90d are both energized, the sleeve 98 and the spur ring gear 99 will be rotated relative to the spindle and in either direction depending upon the directional energization of the motor.

For transmitting such rotation of the ring gear 99 and the jaw slide movement, a first spur gear 105 is journaled, as by needle bearings 106, on a stub shaft 108 depending from the chuck body 50 and supported by means of one of the holddown bolts 52. As shown, the holddown bolt threads directly into the stub shaft 108 rather than passing into a tapped opening 109 originally provided in the sub-table to receive that bolt. The gear 105, in turn, meshes with a second spur gear 110 journaled by anti-friction bearings 111 on a stationary stub shaft 112 locked to the sub-table by means such as a bolt 114.

In keeping with an important aspect of the invention, a disengageable coupling is made between a part of the jaw drive means carried by the spindle 25 and a part carried by the chuck body 50 so that the latter may be easily removed from the spindle. But beyond this, that disengageable coupling is made to produce a lost motion connection so that, even after the jaws have been clamped against a workpiece under the full torque produced by the chuck motor, they are positively released upon reverse energization of the motor due to the impact created by the lost motion of the coupling.

As here illustrated, such a disengageable, lost motion or impact coupling 116 is effected between the gear 110, carried in the spindle 25 on the stub shaft 112, and a bevel gear 115 carried and journaled by the chuck body 50. For this purpose, the spur gear 110 is formed at its upper end with spaced, vertically upright impact teeth adapted to cooperate with mating, spaced impact teeth on the lower end of the bevel gear 115. It will thus be seen that the clutch teeth connecting the gears 110 and 115 form a lost motion impact device, affording a positive drive between the two gears but only after a predetermined angle of lost motion, upon reversal of direction. After the jaws 51 have been tightly clamped against a workpiece, if the chuck motor 75 is reversed an impact occurs to positively retract the jaws from a workpiece even though they had been brought into clamping engagement with the workpiece with the full torque available from the motor 75. Moreover, since the impact coupling teeth, as those skilled in the art will understand, readily slip axially into cooperating relationship, the chuck body 50 may be simply lifted from the sub-table 26 after the holddown bolts 52 are loosened. When it is desired to remove the chuck body 50 and operate the lathe with an ordinary work table or a different type of chuck, no separate disassembly or assembly of drive components is necessary.

For journaling the bevel gear 115, a vertical stub shaft 118 is telescoped into a mating recess in the shaft 112, the former shaft depending from a yoke 119 which is supported from the chuck body and surrounds the shaft 70. Suitable anti-friction thrust bearings 120 take axial loads on the gear 115.

To power the jaw slides 54 and chuck jaws 51 from the bevel gear 115, a mating bevel gear 121 is splined or otherwise suitably fixed to the shaft 70. The latter shaft, as explained above, carries the bevel pinion 71 which in turn drives the bevel ring gear 64 and thus runs the jaw slides 54 radially inward or outward.

While the operation of the power means for adjusting the jaw slides should be apparent from the foregoing, a brief résumé may be helpful. With the clutch coil 90d deenergized and the clutch elements 90a, 90b disengaged, power from the main drive motor 40 supplied to the bevel gear 41 and ring gear 42 serves to rotate the sub-table 26 and chuck body 50 about a vertical axis for regular machining operations. Normal rotation of the sub-table, chuck body, and a workpiece chucked on the body is not impeded by the means for transmitting power to move the chuck jaws. However, with the spindle 25 and chuck body 50 stationary, then the chuck motor 75 may be energized to rotate in either direction and, with the clutch coil 90d energized and the clutch element 90a, 90b frictionally locked, the motor drives the sleeve 98, the spur ring gear 99, and thus turns the shaft 70 through the gears 105, 110, 115 and 121. Rotation of the shaft 70 in either direction causes its bevel gear 71 to correspondingly turn the ring gear 64. This, of course, rotates the bevel gears 62, shifting each of the sleeves 56 radially within the chuck body and also the jaw slides 54 by virtue of their connection to the sleeve afforded by the short shaft 55

Moreover, with the clutch 90 disengaged, the chuck jaw slides may be adjusted either individually or universally without interference from the chuck power-transmitting means. For example, if a given jaw slide and its jaw are to be individually positioned, an Allen wrench may be inserted into the socket 55a in the short shaft 55. Rotation of this shaft will move the corresponding jaw slide 54 radially inward or upward. Alternatively, an Allen wrench may be inserted into the socket 70a of the shaft 70. Rotation of this shaft, as explained, adjusts all of the jaw slides 54 in unison since they are all drivingly connected with the ring gear 64. During such universal manual adjustment, the gears 121, 115, 110, 106, 99 and the sleeve 98 simply turn freely since they are reversible and are disconnected from the worm wheel 86 by the clutch 90. The provision of an annular electromagnetic clutch which is concentric with and surrounds the hollow passage 28 defined by the spindle portion 27, and the use of a relatively thin sleeve 98 hugging the inner surface of the spindle portion 27 leaves the vertical hollow passage 28 substantially unobstructed. As a result, it is possible to insert a shaft or stem downwardly into this passage while an integral flange on that shaft is chucked to the body 50 for turning or any other machining operation. And, as noted above, it is but a simple matter to remove the chuck body 50 from or replace it on the sub-table. That may conveniently be accomplished in but a few minutes without assembly or disassembly of gears or the like on their shafts. Removal of the holddown bolts 52 permits the body to be lifted directly from the sub-table, the impact device 116 affording separation of the impact coupling 116 between the gears 111 and 115, while the stub shaft 108 and the gear 105 are lifted with the body and slipped out of engagement with the mating gears 99 and 110.

The control means for the power operated chuck are, in accordance with the invention, very simple and conveniently operated, yet they afford the utmost in safety against accidental release of a chucked workpiece. Referring particularly to Fig. 4, it will be seen that the main motor 40 for rotating the spindle 25 is energized from a three-phase voltage source through a contactor having a controlling solenoid 130 and three normally open contacts 130a, 130b and 130c. The main motor 40 is started simply by depressing a normally open start push button 131 which energizes the contactor coil 130 from single phase supply lines L1, L2 through a normally closed stop push button switch 132. When the coil 130 is energized, normally open auxiliary contacts 130d close to seal around the start switch 131 so that the motor 40 continues in operation until the stop switch 132 is momentarily depressed.

Since the motor 40 is connected through a releasable clutch 44 to the spindle 25, energization of the motor alone will not result in rotation of the spindle. Preferably, the releasable clutch 44 is of the electro-magnetic type having a controlling coil 44a which, when energized, causes engagement of the clutch. The clutch coil 44a is energized upon closure of normally open contacts 134a of a control relay having a coil 134. That coil is connected between the lines L1, L2 through a normally closed "off" push button switch 135 and a normally open "run" push button switch 136. When the latter switch is momentarily depressed, the relay 134 is energized and seals in through its normally open contacts 134b. This effects drive of the spindle 25 until the "off" switch is momentarily opened to drop out the relay 134 and deenergize the clutch coil 44a.

For controlling the chuck motor 75 so that it may drive in opposite directions, it is energized from the three-phase voltage source alternatively through a forward or a reverse contactor. As shown in Fig. 4, a forward contactor coil 140 controls normally open contacts 140a, 140b, and 140c; while a reverse contactor coil 141 controls normally open contacts 141a, 141b and 141c. Closure of the first set of contacts makes the motor 75 run in a direction to translate the jaw slides 54 radially in, while closure of the second set of contacts energizes the motor 75 in the opposite direction to make the jaw slides run radially out. The two contactor coils 140, 141 are energized from the lines L1, L2 through ganged three-position switches 144 and 145, respectively. When the movable switch elements 144a and 145a are moved upwardly, the coil 140 is energized; while movement of the elements 144a and 145a downwardly from a central or "off" position results in energization of the contactor coil 141.

To control the energization of the chuck clutch coil 90d, the latter is connected directly across the lines L1, L2 through parallel, normally open contacts 140d and 141d which are closed, respectively, upon energization of the corresponding coils 140 and 141. Thus, whenever the chuck motor 75 is energized in either direction, the clutch coil 90d is also energized.

In accordance with one aspect of the present invention, control means are provided to prevent movement of the jaw slides whenever the spindle 25 is in motion. Thus, even though the operator should inadvertently actuate the ganged switches 144, 145 while the workpiece is being rotated, the chuck jaws cannot be loosened, letting the workpiece be thrown from the chuck.

An extremely reliable and simple arrangement is here employed to provide this safety feature. As shown in Fig. 4, a coil 148 of a time delay relay is connected in parallel with the coil 134. The coil 148 is thus energized when the "on" switch 136 is momentarily depressed; and it is deenergized when the "off" switch 135 is momentarily depressed. The time delay relay includes normally closed contacts 148a which open immediately upon energization of the coil 148 but which reclose only after a predetermined time interval from the instant that the coil 148 is deenergized. The contacts 148a are connected in series with the paralleled coils 140, 141 and their corresponding ganged switches 144 and 145, and to the line L1 through the normally closed "off" switch 135.

As long as the coil 134 is deenergized so that the clutch 44 is released and the spindle 25 is stationary, movement of the ganged switches 140, 145 will result in energization of the contactor coils 140, 141 and the clutch coil 90d so that the jaw slides may be translated by power from the motor 75. However, when the spindle 25 is being driven through the engaged clutch 44, the time delay relay coil 148 will be energized and its contacts 148a open. Movement of the switches 144 and 145 from the "off" position cannot energize either of the contactor coils 140, 141; the jaw slides cannot be moved. When the spindle 25 is being stopped as a result of momentary actuation of the switch 135, the coil 148 is immediately deenergized. However, the spindle 25 will continue to rotate for a short interval due to its inertia and it is important that the chuck jaws not be released during this time. Such release is precluded in the present instance because the contacts 148a do not open until a predetermined time has lapsed from the instant that the "off" switch 135 is opened and the coil 148 deenergized. Accordingly, while the spindle 25 is coasting to a stop it is impossible for an operator to inadvertently release the chuck jaws by actuating the switches 144 and 145.

In handling certain workpieces which are relatively fragile, it is important that the chuck jaws be prevented from crushing them by excessive clamping pressures. On the other hand, in handling heavy, rigid workpieces it is important to chuck them with the maximum force available from the torque produced by the chuck motor 75. The present invention meets both of these requirements by the simple means to adjust the maximum clamping force which may be exerted by the chuck jaws. As shown in Fig. 4, a variable or tapped resistor 150 is connected in series with the clutch coil 90d. By adjusting the tap 150a for this resistor, the current which flows through the coil 90d may be varied as desired. This, in turn, adjusts the force with which the two friction elements of the electric clutch 90 are brought together and determines the maximum torque which can be transmitted by their frictional engagement. Accordingly, with the resistor 150 set to limit the current through the clutch coil 90d, the motor 75 drives the jaws against a workpiece until they exert a predetermined force. Thereafter, the two frictional clutch elements simply slip relatively to one another and prevent forces on the workpiece which might deform it.

I claim:

1. For use with a machine tool having a rotatable spindle, a power-operated chuck comprising, in combination, a body adapted to be fixed to the spindle for rotation therewith, a plurality of jaw slides angularly spaced in said body and radially movable relative thereto, a drive shaft journaled in said body, means drivingly connecting said shaft with said slides to radially translate the latter upon rotation of the former, a reversible chuck motor, a disengageable electric clutch having a first friction element drivingly connected to the motor and a second friction element mounted on and rotatable both with and relative to the spindle, said clutch including a coil adapted upon energization thereof to bring said elements into frictional driving engagement, first gear means carried by the spindle and drivingly connected to said second clutch element, second gear means carried by said body and drivingly connected with said shaft, and impact coupling means between said first and second gear means for connecting the two when said body is fixed to the spindle, whereby the spindle may turn independently of said motor and first clutch element when said clutch is disengaged and the motor may drive said slides in or out when the spindle is stationary and said clutch is engaged.

2. For use on a vertical turret lathe having a sub-table with a depending hollow spindle portion rotatable about a vertical axis, a power-operated chuck comprising, in combination, an annular body adapted to be fixed to the sub-table and mounting a plurality of angularly spaced jaw slides movable radially relative thereto, a radially extending shaft journaled in said body, means drivingly connecting said shaft upon rotation thereof to translate said slides radially of the table, an electric clutch having two annular elements concentric about the axis of the sub-table and frictionally locked together upon energization of an electro-magnetic coil, a reversible motor and means for drivingly connecting it to one of said clutch elements, a sleeve journaled on the inner surface of the spindle portion and connected at its lower end to the other of said clutch elements, a spur ring fixed to the top of said sleeve, a disengageable impact coupling having a first part carried by the sub-table and a second part carried by said body, said parts being adapted to drivingly engage as said body is fixed in place on the sub-table, gear means in the sub-table interconnecting said spur ring and said first coupling part, and gear means in the sub-table interconnecting said second coupling part and said shaft.

3. For use on a vertical turret lathe having a sub-table with a depending hollow spindle portion rotatable about a vertical axis, a power-operated chuck comprising, in combination, an annular chuck body adapted to be removably fixed to the sub-table and mounting a plurality of angularly spaced jaw slides movable radially relative thereto, a plurality of angularly spaced, radially extending shafts journaled in said body, said shafts being socketed at their outermost ends to afford rotation thereof by a hand wrench, a bevel ring gear journaled in said body for rotation about the vertical axis thereof, bevel pinions on respective ones of said shafts and meshed with said bevel ring gear, means including bevel pinions meshed with said bevel ring gear for moving said slides radially of said body in response to rotation of said bevel ring gear, an electro-magnetic clutch having first and second annular friction elements and an annular coil for locking said elements upon energization thereof, all disposed beneath and coaxially of the spindle portion, a reversible electric motor and means drivingly connecting it to said first clutch element, a hollow sleeve concentric with and extending upwardly through the hollow spindle portion and journaled for rotation relative to the spindle portion, means for connecting said second clutch element to the lower end of said sleeve, a spur ring gear fixed to the upper end of said sleeve, a disengageable impact coupling having a first part journaled in the sub-table and a second part journaled in said body, said parts being located to engage as the body is fixed to the sub-table, means including an idler gear journaled in the sub-table for drivingly connecting said spur ring gear and said first coupling part, and means including a bevel gear journaled in said body and a mating bevel gear fast on one of said shafts for drivingly connecting the latter with said second coupling part, whereby rotation of the motor with said clutch engaged drives the jaw slides radially in or out on the body, rotation of one of said shafts by a hand wrench with said clutch disengaged drives the jaw slides radially in or out, and rotation of the sub-table with the clutch disengaged leaves the jaw slides in selected radial positions.

4. In a lathe, the combination of an annular sub-table rotatable on a stationary base, an annular chuck body mounted on said sub-table and having jaw slides movable radially therein, an electric motor mounted on the base, an electro-magnetic clutch having first and second annular friction elements carried by and rotatable relative to said base and sub-table, respectively, said annular friction elements being disposed beneath and coaxially of said sub-table to leave a clear passage through the latter to receive a stem or projection of a workpiece held on the chuck body, means drivingly connecting said motor and first clutch element, and means interconnecting said second clutch element and said slides to translate the latter radially of the body upon rotation of the former relative to the sub-table.

5. In a vertical turret lathe, a work support comprising, in combination, a base, a sub-table having a depending hollow spindle portion journaled in said base and adapted to be rotationally driven about a vertical axis, an annular chuck body fixed to said sub-table and having a central opening alined with the interior of the spindle portion, a plurality of chuck jaw slides radially movable relative to said body, an electro-magnetic clutch having first and second annular friction elements rotatably carried respectively by said base and on said spindle portion, said clutch elements being concentric with the spindle portion and leaving the interior thereof unobstructed, a reversible motor mounted in said base and connected to said first clutch element, and means connecting said second clutch element upon rotation thereof relative to the spindle portion to translate the jaw slides radially relative to the table, whereby a workpiece may be chucked to the body with a part thereof depending into the hollow spindle portion.

6. In a lathe having a sub-table with a hollow spindle portion journaled for rotation in a base, a power chuck arrangement comprising, in combination, an annular body adapted to be fixed to the sub-table and having radially movable jaw slides, an electro-magnetic clutch having first and second annular friction elements disposed coaxially about the spindle portion, means journaling said first clutch element in said base, a reversible motor and means drivingly connecting it to said first clutch element, a hollow sleeve extending through and journaled by said spindle portion and connected to said second clutch element, and means interconnecting said sleeve and jaw slides to translate the latter radially upon rotation of the former relative to the spindle portion, whereby a portion of a workpiece chucked to said body may extend through the spindle portion and sleeve.

7. The combination set forth in claim 1 further characterized in the provision of means for applying an adjustable energizing voltage to said clutch coil so that the maximum torque transmittable by said clutch may be varied to change the chucking force exerted by said jaw slides.

8. In a vertical turret lathe, the combination of a sub-table journaled on a base and a main motor for rotationally driving it, a chuck body fixed to the sub-table and having jaw slides radially movable thereon, an electro-magnetic clutch having a coil and first and second frictional elements drivingly engaged upon energization of the coil, said first and second elements being carried by and rotatable relative to the base and sub-table, respectively, a chuck motor drivingly connected to said first clutch element, means interconnecting said jaw slides and said second clutch element for moving the former radially on the body upon rotation of the latter relative to the sub-table, and control means for preventing engagement of said clutch while said sub-table is rotating.

9. In a vertical turret lathe, the combination comprising a sub-table journaled on a base, a main motor and means including a first clutch connecting it to rotationally drive said sub-table, a chuck body fixed to said sub-table and having radially movable jaw slides thereon, an electro-magnetic clutch having a coil and first and second friction elements carried by and journaled on the base and sub-table, respectively, a chuck motor fixed to the base and drivingly connected to said first clutch element, means interconnecting said second clutch element and said jaw slides to translate the latter radially upon rotation of the former relative to the sub-table, and means for preventing the energization of said clutch coil while said first clutch is engaged so that a chucked workpiece cannot be inadvertently loosened and thrown.

10. The combination set forth in claim 9 further characterized by the provision of means for preventing energization of said clutch coil for a predetermined period after the first clutch is disengaged so that the jaw slides cannot be moved to loosen a chucked workpiece while the sub-table and chuck body are being brought to a stop.

References Cited in the file of this patent

UNITED STATES PATENTS

| | | |
|---|---|---|
| 1,441,803 | Hay | Jan. 9, 1923 |
| 1,772,203 | Bush | Aug. 5, 1930 |
| 1,818,167 | Sears | Aug. 11, 1931 |
| 1,961,605 | Drissner | June 5, 1934 |
| 1,971,537 | Sloan | Aug. 28, 1934 |
| 2,180,488 | Hamersveld | Nov. 21, 1939 |
| 2,245,384 | Bullard | June 10, 1941 |
| 2,445,497 | Schurr | July 20, 1948 |
| 2,445,498 | Schurr | July 20, 1948 |
| 2,573,152 | Leifer | Oct. 30, 1951 |
| 2,687,197 | Leifer | Aug. 24, 1954 |
| 2,699,695 | Addison | Jan. 18, 1955 |
| 2,713,493 | Herbst | July 19, 1955 |